Jan. 31, 1928. 1,657,703
J. H. WAGENHORST
VEHICLE WHEEL
Original Filed July 17, 1924  2 Sheets-Sheet 1

INVENTOR.
J.H.Wagenhorst
BY
his ATTORNEYS

Jan. 31, 1928.　　　　　　　　　　　　　　　　　　1,657,703
J. H. WAGENHORST
VEHICLE WHEEL
Original Filed July 17, 1924　　2 Sheets-Sheet 2
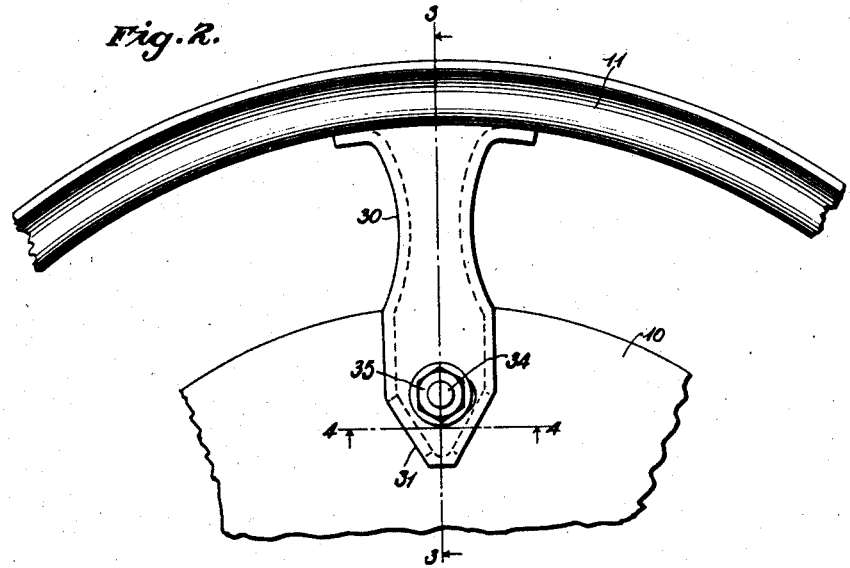
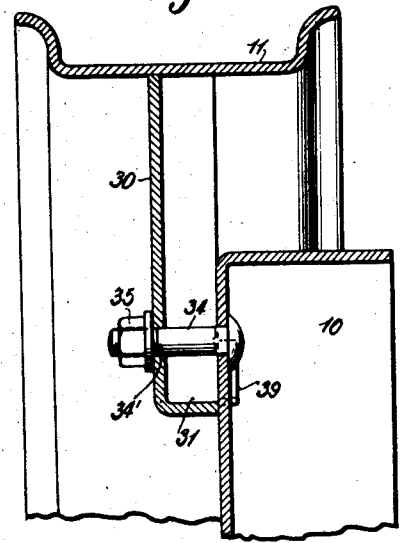
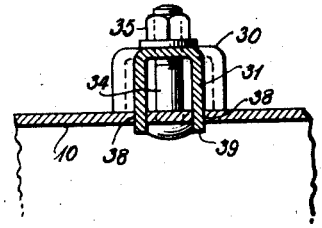
INVENTOR.
J.H. Wagenhorst
BY
ATTORNEYS Patented Jan. 31, 1928.

1,657,703

UNITED STATES PATENT OFFICE.

JAMES H. WAGENHORST, OF JACKSON, MICHIGAN.

VEHICLE WHEEL.

Original application filed July 17, 1924, Serial No. 726,529. Divided and this application filed April 2, 1927. Serial No. 180,476.

My present invention relates to vehicle wheels, and has to do more particularly with the construction of wheels intended for use upon automobiles and for carrying a resilient tire, preferably, of the pneumatic type. This application is a division of my co-pending application for Letters Patent for improvements in vehicle wheels, Serial No. 726,529, filed July 17th, 1924.

The widespread use of balloon tires, or tires of larger cross-section than those heretofore used on automobiles of corresponding size and weight, has resulted in a considerable decrease in the diameter and an increase in the width of the demountable rims. The result of this change is that the rims now used for tires of the balloon type, are considerably stiffer and stronger than the rims heretofore used, for automobiles of corresponding size and weight. Coincident with the widespread adoption of balloon tires has been the use on many automobiles of four-wheel braking systems necessitating the mounting of brake drums on front as well as rear hubs. These changes have resulted in a marked increase in the unsprung weight on the front axle, which increase has been so noticeable, in some cases, as to require the redesign of the axle to strengthen it.

In connection with these changes, the old practice has heretofore been followed, however, in the design and manufacture of the wheels, and the wheels are heavier and more expensive than they need to be, and contribute unnecessarily to the unsprung weight on the front axle. The main object of my present invention is to provide an improved wheel construction, in which the weight of the wheel shall be kept as low as possible, and the total cost of the wheel, including the brakedrum, reduced considerably, without weakening it so that it will not adequately withstand the forces, such as load, sidethrust, and torque, imposed upon the structure. With that end in view, I propose to provide a construction in which the brakedrum constitutes the body of the wheel, and the tire-carrying rim is detachably connected to the brakedrum by means of relatively short spoke members, or lugs, rigidly secured to the rim and detachably connected to the brakedrum.

It is an object of my invention to provide a wheel construction in which the load, sidethrust, and torque are transmitted through the brakedrum from hub to rim, or vice versa, and in which the tire-carrying rim is detachably connected to the drum by spoke members rigidly secured to the rim and interlocked with the brakedrum so that these forces may be adequately transmitted.

It is a further object of my invention to provide a wheel construction having relatively short spoke members rigidly secured to the rim and detachably connected to the brakedrum, of such construction that they can be manufactured very cheaply, add little to the weight, may be cheaply and quickly secured to the rim, and have ample strength to withstand the stresses exerted upon them, and to transmit such stresses from rim to brakedrum, or vice versa.

Further objects, and objects relating to details and economies of construction and operation, will definitely appear from the detailed description to follow. In one instance, I accomplish the objects of my invention by the devices and means set forth in the following specification. My invention is clearly defined and pointed out in the appended claims. A structure constituting a preferred embodiment of my invention is illustrated in the accompanying drawings, forming a part of this specification, in which,—

Fig. 2 is a fragmentary view in side elevation illustrating a single spoke member and its connection with the brakedrum, in detail;

Fig. 3 is a vertical sectional view taken on the line 3—3 of Fig. 2;

Fig. 4 is a transverse sectional view taken on the line 4—4 of Fig. 2;

In the drawings, the same reference numerals refer to the same parts throughout the several views.

Figure 1:
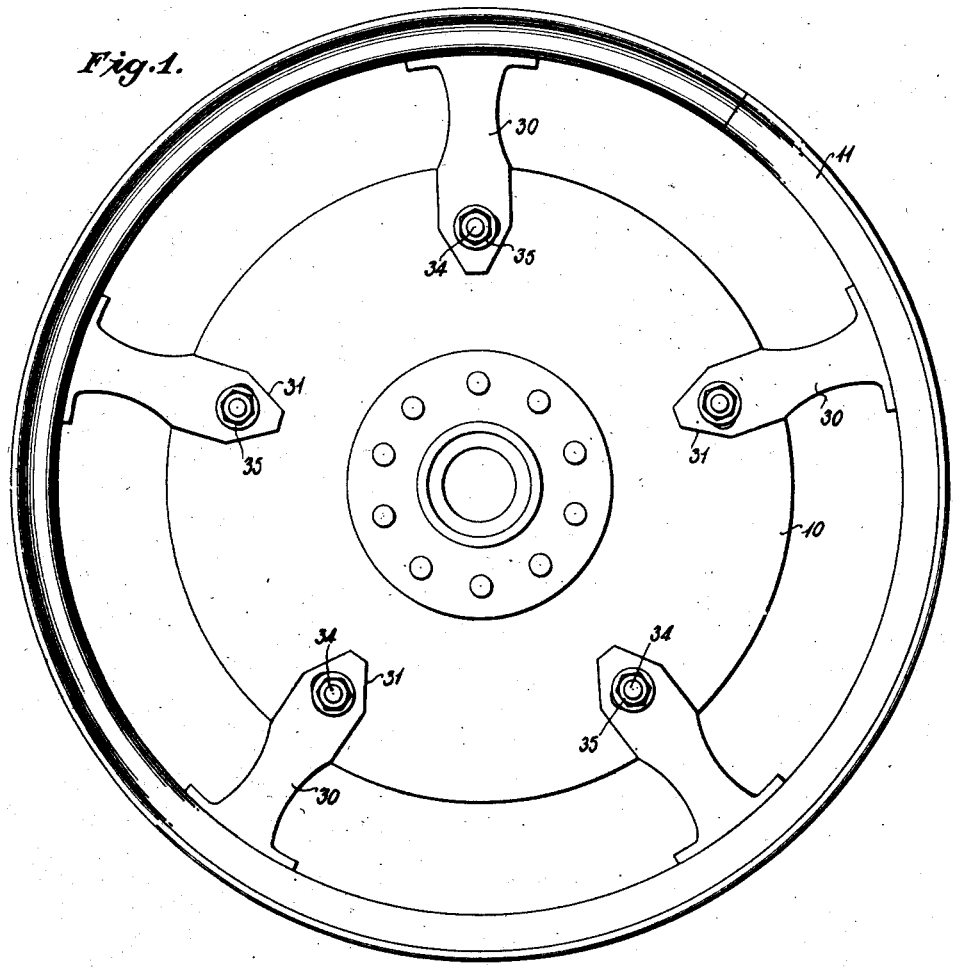
Figure 1 is a view in side elevation of a wheel embodying my invention.
Figure 5:
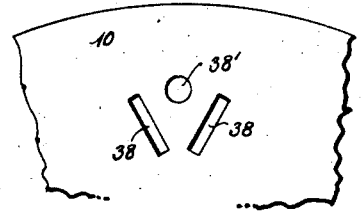
Fig. 5 is a fragmentary view in side elevation of a portion of the brakedrum showing a bolt hole and the inclined slots which receive projecting portions of a spoke member.

Referring to the numbered parts of the drawings, which illustrate a preferred embodiment of my invention, I have shown a brakedrum 10, connected to a hub in any suitable manner. The side wall of the brakedrum has a plurality of bolt holes 38', formed therein, adjacent the periphery and adjacent each bolt hole a pair of converging slots 38 are punched through the side wall of the drum, such slots being located as shown in Fig. 5.

The tire carrying rim 11, of the usual construction, which is shown as provided with straight side flanges, but may, of course, have clincher flanges, or be of the Q. D. type, if desired, has a plurality of relatively short spoke members 30, rigidly secured to the base of the rim. These spoke members may be of pressed metal and of channel formation, in order to give them adequate strength to withstand the stresses acting upon them. The outer portion of each spoke member is extended at 32, along the inner face of the rim base, and rigidly secured to the latter. The inner end of each spoke member has inclined or converging side walls 31, provided with projecting portions 39 which fit in the converging slots 38. A securing bolt 34 extends through the bolt hole 38' and through a bolt hole 34', formed in the spoke member. The nut 35, screwed on the end of the bolt 34, engages the spoke member and clamps it against the side wall of the brakedrum with the projections 39 seated in interlocking engagement in the slots 38.

This forms a relatively inexpensive construction, in which the tire-carrying rim is detachably connected to the brakedrum, by means of the spoke members which are rigidly secured to the rim, and detachably connected to the brakedrum. These spoke members are of such formation as to transmit effectively the load, sidethrust, and torque, which forces are transmitted through them from the rim to the brakedrum, or vice versa. The engagement of the projections 39 in the slots 38 results in the transmission of such forces directly from the spoke members to the drum and this is more effective than if such forces were transmitted through the securing bolt because of the tendency for such a bolt to enlarge the bolt hole by wear, thus permitting play in the connection. In my construction, the stresses are taken from the bolt by the direct engagement between the spoke member and the brakedrum, and the bolt serves merely to clamp the parts together.

It will be observed that, in this wheel of my invention, the only weight in addition to that of the brakedrum and rim, is the weight of the relatively small and short spoke members attached to the rim, and the nuts and bolts by which these spokes are detachably connected to the brakedrum. The weight of these parts is much less than the weight of the usual spoke and felly construction, used heretofore with the brakedrum, in wheels in which the load, sidethrust, and torque are transmitted from rim to hub, or vice versa, through the felly and spoke constructions, instead of being transmitted directly through the brakedrum, as in my improved wheel.

I am aware that this construction may be varied considerably without departing from the spirit of my invention, and, therefore, I claim my invention broadly, as set forth in the appended claims.

What I claim is:

1. A wheel comprising the combination of a brakedrum having openings formed in the side wall thereof, a tire-carrying rim, a plurality of spoke members rigidly secured to said rim and having projections on their inner ends interlocking in said openings, and means for detachably connecting the inner ends of said spoke members to the brakedrum.

2. A wheel comprising the combination of a brakedrum having a plurality of pairs of openings formed in the side wall thereof, a tire-carrying rim, a plurality of spoke members rigidly secured to said rim and having pairs of projections on their inner ends interlocking in said openings, and means for detachably connecting the inner ends of said spoke members to the brakedrum.

3. A wheel comprising the combination of a brakedrum having openings formed in the side wall thereof, a tire-carrying rim, a plurality of spoke members rigidly secured to said rim and having projections on their inner ends interlocking in said openings, bolts extending though the side wall of said brakedrum adjacent the openings, and nuts screwed on said bolts and clamping the inner ends of the spoke members in interlocking engagement with said brakedrum.

4. A wheel comprising the combination of a brakedrum having a plurality of pairs of openings formed in the side wall thereof, a tire-carrying rim, a plurality of spoke members rigidly secured to said rim and having pairs of projections on their inner ends interlocking in said openings, bolts extending through the side wall of the brakedrum between the openings of the respective pairs, and nuts screwed on said bolts and clamping the inner ends of said spoke members in interlocking engagement with said brakedrum.

5. A wheel comprising the combination of a brakedrum having a plurality of pairs of slots in the side wall thereof and bolt holes located between the slots of each pair, a tire-carrying rim, a plurality of spoke members rigidly secured to the rim, the inner end of each spoke member having projections interlocking in the corresponding slots, bolts extending through said bolt holes and spoke members, and nuts screwed on said bolts and clamping the inner ends of said spoke members in interlocking engagement with the brakedrum.

6. A wheel comprising the combination of a brakedrum having a plurality of pairs of oppositely inclined slots in the side wall thereof and bolt holes located between the slots of each pair, a tire-carrying rim, a plurality of spoke members rigidly secured to the rim, the inner end of each spoke member having oppositely inclined projections interlocking in the corresponding slots, bolts extending through said bolt holes and spoke members, and nuts screwed on said bolts and clamping the inner ends of said spoke members in interlocking engagement with the brakedrum.

7. A wheel comprising the combination of a brakedrum having a plurality of pairs of oppositely inclined slots in the side wall thereof and bolt holes located between the slots of each pair, a tire-carrying rim, a plurality of channel-shaped spoke members rigidly secured to the rim, the side walls of each spoke member having oppositely inclined projections interlocking in the corresponding pair of slots, bolts extending through said bolt holes and spoke members, and nuts screwed on said bolts and clamping the inner ends of said spoke members in interlocking engagement with the brakedrum.

JAMES H. WAGENHORST.